United States Patent Office 3,445,470
Patented May 20, 1969

3,445,470
HETEROCYCLIC DERIVATIVES OF ARYL SULFONYL CARBAMIC ACID
Ernst Jucker, Ettingen, and Adolf J. Lindenmann, Basel, Switzerland, assignors to Sandoz Ltd., Basel, Switzerland
No Drawing. Filed Jan. 6, 1965, Ser. No. 423,869
Claims priority, application Switzerland, Jan. 9, 1964, 222/64
Int. Cl. C07d 43/06; A61k 27/00
U.S. Cl. 260—292          6 Claims

ABSTRACT OF THE DISCLOSURE

Phenyl and substituted phenyl sulfonyl carbamic acid derivatives are prepared by treating an arylsulfonyl compound with a heterocyclic secondary amine. The resulting novel compounds, e.g., 8-(p-tolylsulphonyl-carbamoyl)-8-azabicyclo[3,2,1]octane, are useful as anti-diabetics.

---

The present invention relates to new heterocyclic compounds and a process for their production. The present invention provides heterocyclic sulphonyl-carbamic acid derivatives of Formula I,

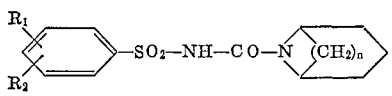

in which $R_1$ signifies a hydrogen atom, an amino or acetylamino radical, $R_2$ signifies a methyl radical or a halogen atom, and $n$ signifies 2 or 3.

The present invention further provides a process for the production of compounds of the Formula Ia,

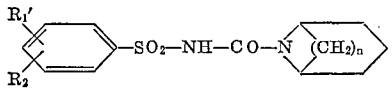

in which $R_2$ and $n$ have the above significance, and $R_1'$ signifies a hydrogen atom or an acetylamino radical, and their acid addition salts, characterized in that a compound of Formula II,

in which $n$ has the above significance, is reacted with a compound of Formula III,

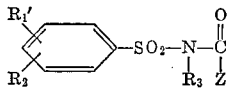

in which either $R_3$ signifies a hydrogen atom and Z is an alkoxy radical of 1 to 4 carbon atoms or an amino radical, or Z and $R_3$ together signify a second bond between the carbon atom and the nitrogen atom, and $R_1'$ and $R_2$ have the above significance.

It should be noted that those of the compounds of Formula I, wherein $R_1$ signifies —$NH_2$, may be obtained by saponifying the corresponding acetylamino compound.

One method of effecting the process of the invention consists in that nortropane or granatanine (also named 8-azabicyclo[3,2,1]octane and 9-azabicyclo[3,3,1]nonane respectively) and a Compound III is reacted in an inert anhydrous organic solvent, e.g. absolute benzene or absolute toluene, and the solvent is distilled off from the solution during the course of 2 to 3 hours, fresh solvent being added continuously at such a rate that the initial volume is maintained. The final product is isolated in a manner known per se and purified by crystallization.

When a sulphonyl-isocyanate is used as starting material III the process may be effected, for example, in that nortropane or granatanine, dissolved in absolute benzene or absolute toluene, is slowly added at room temperature to a solution of the sulphonyl-isocyanate, e.g., p-chlorobenzene-, p-fluorobenzene-, acetylaminobenzene, or acetylbenzene-sulphonyl-isocyanate, dissolved in more of the same solvent. In order to complete the reaction, the reaction mixture is left to stand for some time or is slightly heated, the final product is then isolated and purified in a manner known per se.

The compounds of Formula I have valuable pharmacodynamic properties whilst their toxicity is low. In animal tests with the exemplified compounds of Formula I it was found that small doses have a pronounced blood sugar decreasing effect of adequate duration and are well tolerated; they are therefore indicated for use in therapy as antidiabetics, e.g., for oral administration in the treatment of Diabetes mellitus.

The compounds 8-(p-tolyl-sulphonyl-carbamoyl)-8-azabicyclo[3,2,1]octane and 8-(p-chlorobenzene-sulphonylcarbamoyl)-8-azabicyclo[3,2,1]octane have been found to have an especially pronounced blood sugar decreasing effect.

The compounds of Formula I are indicated for administration perorally in the form of tablets, dragées, capsules or syrup. In order to produce medicinal preparations the compounds may be worked up with inorganic or organic adjuvants which are inert and physiologically acceptable. Examples of such adjuvants are: dicalcium phosphate, methyl cellulose, talc, stearic acid, sorbic acid. The preparations may furthermore contain suitable preserving agents, synthetic sweetening and colouring substances and flavourings.

The present invention therefore further provides pharmaceutical compositions containing, in addition to a physiologically acceptable carrier, a compound of Formula I.

In the following non-limitative examples all temperatures are indicated in degrees centigrade and are uncorrected.

EXAMPLE 1

8-(p-tolyl-sulphonyl-carbamoyl)-8-azabicyclo[3,2,1]octane

The solvent is distilled off from a solution of 4.9 g. of p-toluene-sulphonyl-carbamic acid ethyl ester and 2.2 g. of nortropane in 200 cc. of absolute benzene at 100° during the course of 3 hours whilst simultaneously adding fresh benzene at such a rate that the initial volume is maintained. The ethanol resulting during the reaction is removed in this manner. The benzene is then completely distilled off at 15 mm. Hg and the solid residue is made to crystallize from benzene/petroleum ether. After recrystallization from benzene and dioxane the compound melts at 135–137°.

EXAMPLE 2

8-(p-chlorobenzene-sulphonyl-carbamoyl)-8-azabicyclo[3,2,1]octane

This compound is obtained from 5.3 g. of p-chlorobenzene-sulphonyl-carbamic acid ethyl ester and 2.2 g. of nortropane in 200 cc. of absolute benzene in a manner analogous to that described in Example 1. Purification is effected in that the solid residue obtained after evaporating the benzene is recrystallized twice from ethanol/ether. Melting point 178–180°.

EXAMPLE 3

8-(3-acetylamino-4-methyl-benzene-sulphonyl-carbamoyl)-8-azabicyclo[3,2,1]octane A suspension of 6.0 g. of 3-acetylamino-4-methyl-benzene-sulphonyl-carbamic acid ethyl ester and 2.2 g. of nortropane in 200 cc. of absolute benzene is heated to the boil for 4 hours, whereby an oily precipitate forms. After cooling to room temperature the benzene is decanted and a small amount of ethanol is added to the oily residue, whereby 8-(3-acetylamino-4-methyl-benzene-sulphonyl-carbamoyl)-8-azabicyclo[3,2,1]octane crystallizes. Melting point 229–230°.

EXAMPLE 4

8-(3-amino-4-methyl-benzene-sulphonylcarbamoyl)-8-azabicyclo[3,2,1]octane

This compound is produced by saponification of 8-(3-acetylamino - 4-methyl-benzene-sulphonyl-carbamoyl)-8-azabicyclo[3,2,1]octane with 3 N sodium hydroxide solution.

EXAMPLE 5

8-(p-tolyl-sulphonylcarbamoyl)-8-azabicyclo[3,2,1]octane

A solution of 1.7 g. of nortropane in 40 cc. of absolute benzene is slowly added to a solution of 3.0 g. of p-toluene-sulphonyl-isocyanate in 100 cc. of absolute benzene at room temperature whilst stirring. The reaction mixture is left to stand for some time and the benzene is then evaporated at 15 mm. Hg. The solid residue is recrystallized first from benzene/petroleum ether and then from benzene and dioxane. Melting point 135–137°.

EXAMPLE 6

8-(p-chlorobenzene-sulphonylcarbamoyl)-8-azabicyclo[3,2,1]octane 1.1 g. of nortropane in 40 cc. of absolute benzene are added dropwise to a solution of 2.2 g. of p-chlorobenzene-sulphonyl-isocyanate in 60 cc. of absolute benzene whilst stirring during the course of 45 minutes. In order to complete the reaction heating is effected to 80° for 4 hours whilst stirring further. The benzene is then removed at 15 mm. Hg. The resulting solid residue is recrystallized twice from ethanol/ether. Melting point 178–180°.

EXAMPLE 7

9-(p-chlorobenzene-sulphonyl-carbamoyl)-9-azabicyclo[3,3,1]nonane

The solvent is distilled off from a solution of 4.3 g. of 9-azabicyclo[3,3,1]nonane and 9.1 g. of p-chlorobenzene-sulphonyl-carbamic acid ethyl ester in 200 cc. of benzene at 100° during the course of 3 hours whilst simultaneously adding fresh benzene at such a rate that the initial volume is maintained. The ethanol resulting during the reaction is removed in this manner. The benzene is then completely distilled off in a water jet vacuum and the solid crystalline residue is recrystallized twice from ethanol. Melting point of the compound 156–158°.

What is claimed is:

1. A compound selected from the group consisting of heterocyclic sulphonyl-carbamic acid derivatives of Formula I

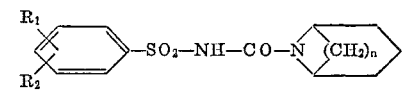

in which $R_1$ is a member selected from the group consisting of hydrogen, amino and acetylamino and
$R_2$ is a member selected from the group consisting of methyl and halogen and
$n$ denotes an integer from 2 to 3.

2. 8-(p-tolyl-sulphonyl-carbamoyl)-8-azabicyclo[3,2,1]octane.

3. 8-(p-chlorobenzene-sulphonyl-carbamoyl)-8 - azabicyclo[3,2,1]octane.

4. 8 - (3-acetylamino-4-methyl-benzene-sulphonyl-carbamoyl)-8-azabicyclo[3,2,1]octane.

5. 8 - (3 - amino-4-methyl-benzene-sulphonyl-carbamoyl)-8-azabicyclo[3,2,1]octane.

6. 9-(p-chlorobenzene-sulphonylcarbamoyl)-9 - azabicyclo[3,3,1]nonane.

References Cited

UNITED STATES PATENTS

| | | | |
|---|---|---|---|
| 3,063,903 | 11/1962 | Wright | 260—553 |
| 3,184,464 | 5/1965 | Haack et al. | 260—553 |
| 3,372,164 | 3/1968 | Haack et al. | 260—292 |

HENRY R. JILES, *Primary Examiner.*

A. L. ROTMAN, *Assistant Examiner.*

U.S. Cl. X.R.

260—293.4, 999